Sept. 29, 1970     H. R. FRANKLE     3,531,105

CARD FEEDING APPARATUS

Filed April 16, 1968     5 Sheets-Sheet 1

INVENTOR.
HARRY R. FRANKLE
BY Kenway, Jenney
 & Hildreth
ATTORNEY.

Sept. 29, 1970           H. R. FRANKLE           3,531,105
CARD FEEDING APPARATUS
Filed April 16, 1968           5 Sheets-Sheet 2
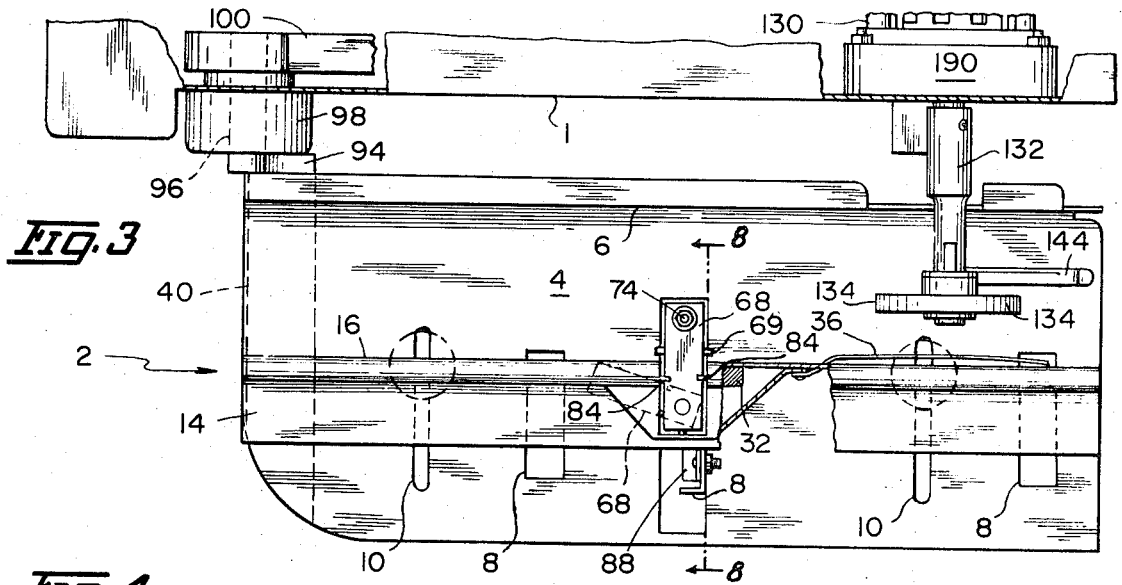
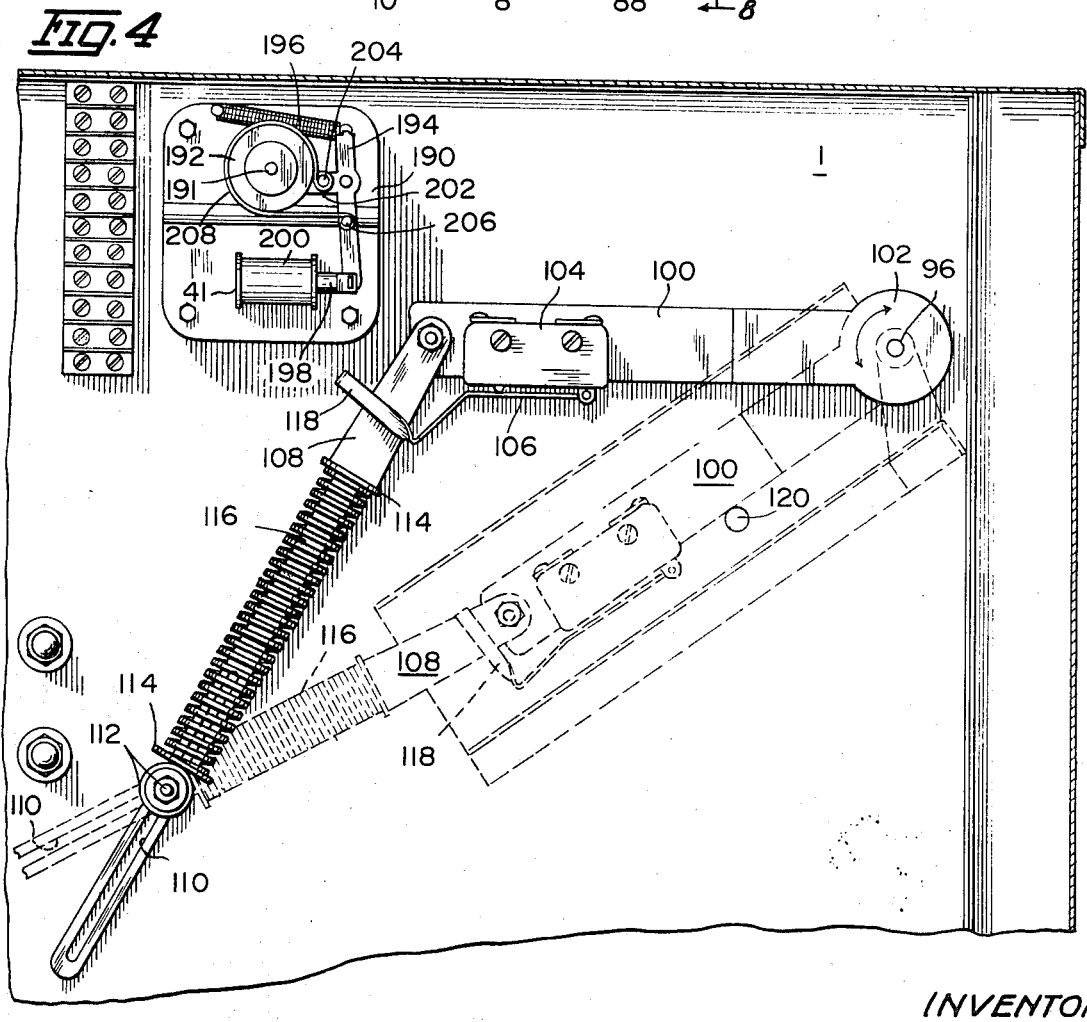
INVENTOR.
HARRY R. FRANKLE
BY Kenway, Jenney
   + Hildreth
          ATTORNEY.

Sept. 29, 1970     H. R. FRANKLE     3,531,105
CARD FEEDING APPARATUS
Filed April 16, 1968     5 Sheets-Sheet 3
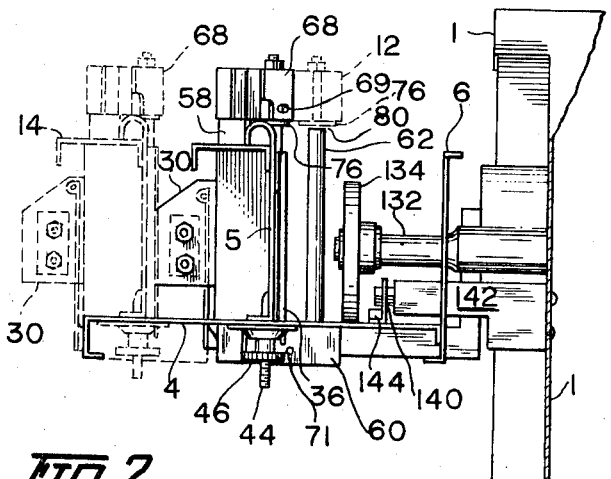
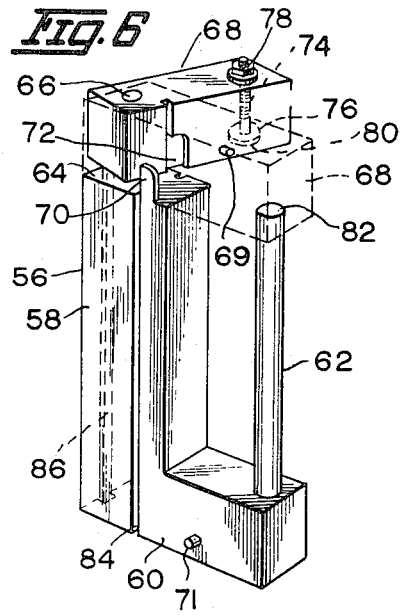
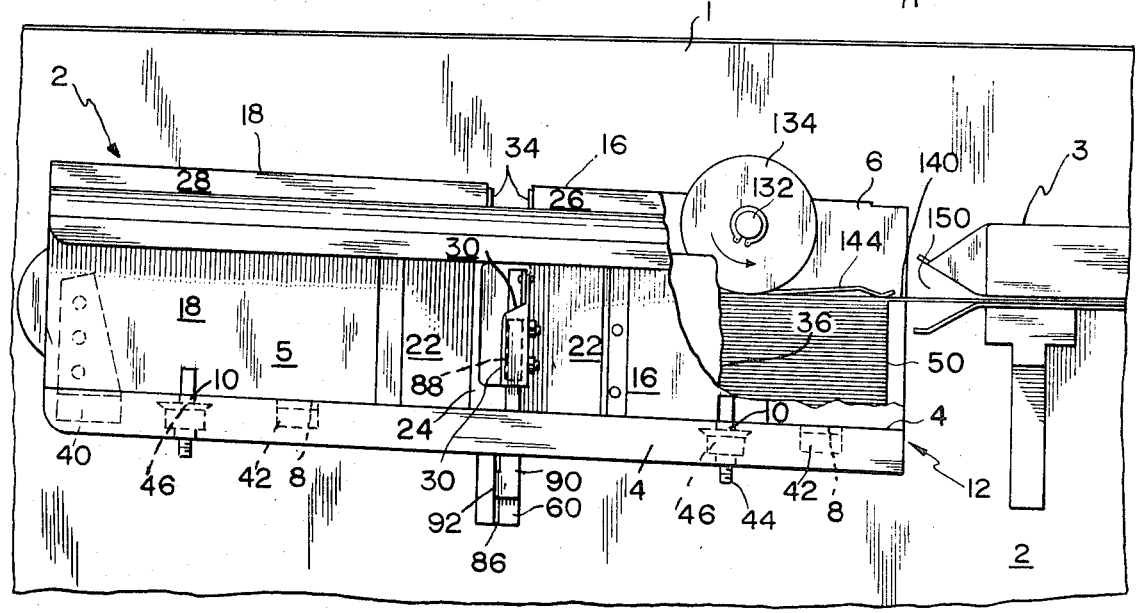
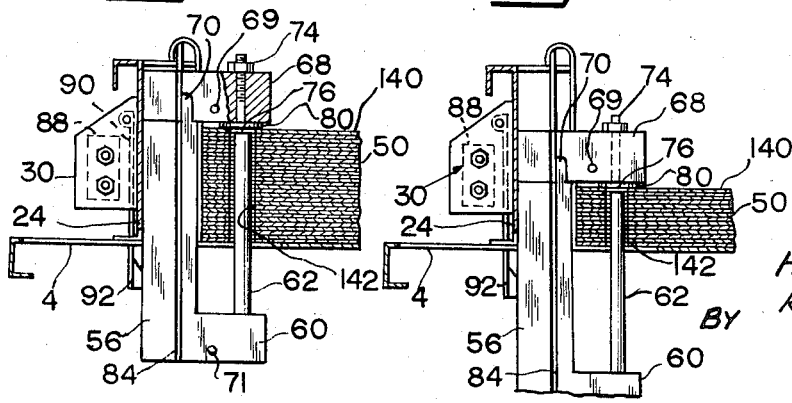
INVENTOR.
HARRY R. FRANKLE
BY Kenway, Jenney
& Hildreth
ATTORNEY.

Sept. 29, 1970    H. R. FRANKLE    3,531,105
CARD FEEDING APPARATUS
Filed April 16, 1968    5 Sheets-Sheet 4
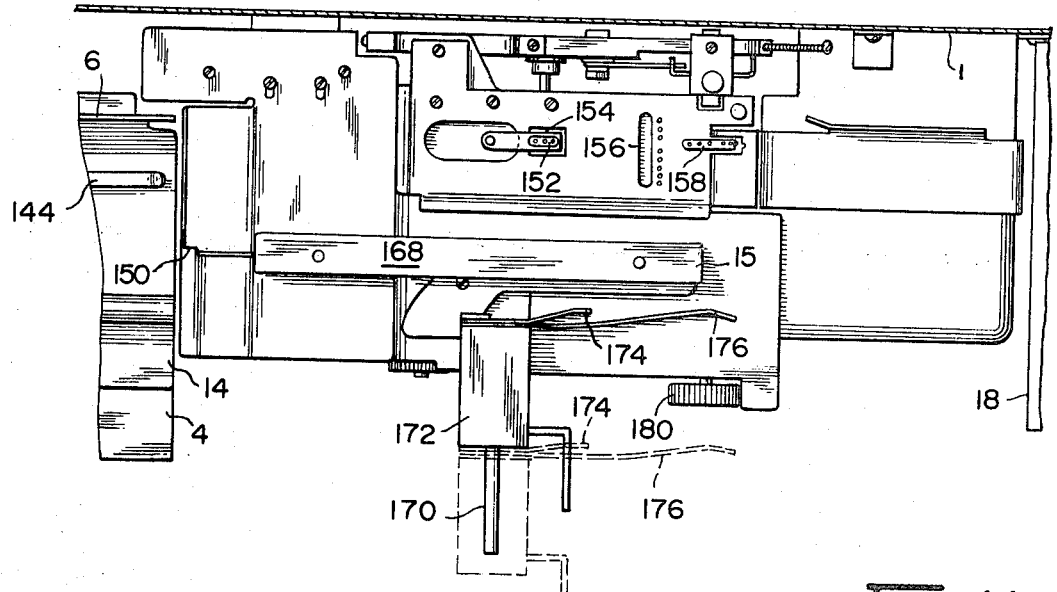
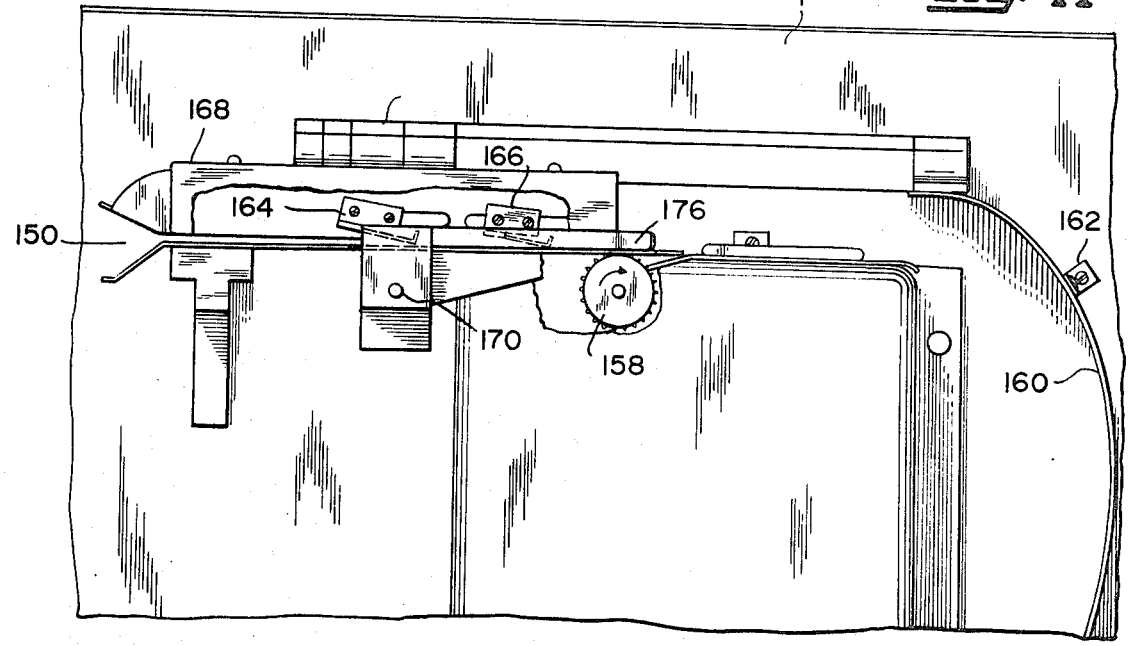
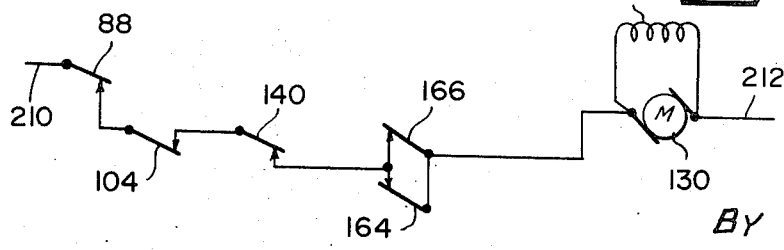
INVENTOR.
HARRY R. FRANKLE
BY Kenway, Jenney
& Hildreth
ATTORNEY.

Sept. 29, 1970     H. R. FRANKLE     3,531,105
CARD FEEDING APPARATUS

Filed April 16, 1968     5 Sheets-Sheet 5

INVENTOR
HARRY R. FRANKLE
BY Kenway, Jenney
+ Hildreth
ATTORNEYS

United States Patent Office 3,531,105
Patented Sept. 29, 1970

3,531,105
CARD FEEDING APPARATUS
Harry R. Frankle, 4021 River Oak Drive,
Des Moines, Iowa 50312
Filed Apr. 16, 1968, Ser. No. 721,680
Int. Cl. B65h 3/06
U.S. Cl. 271—36                    9 Claims

ABSTRACT OF THE DISCLOSURE

The invention is an apparatus for feeding punched cards one at a time into a reader. The apparatus comprises a hopper for containing the cards, the cards being mounted on a spindle slidably projecting upwardly through the base of the hopper. An arm overlies the upper end of the spindle and is separated therefrom by a gap slightly greater than the thickness of each of the cards. In use the arm rests on the top card of the stack, so that the top card is positioned to slide through the gap. A rubber roller or wheel slides the successive top cards from the stack and feeds them into the reader, only one card at a time being allowed to pass through the gap because of the latter's size.

BACKGROUND OF INVENTION

As indicated in the Abstract of Disclosure, the invention lies in the general field of mechanisms for feeding what are called edge punched cards, and particularly those used for automatic typing machinery such as the Friden Flexowriter, and other such machines. Various mechanisms have been devised in the past for feeding cards, many of these mechanisms constituting a so-called knife feed. However, a knife feed will not feed the type of cards used in the automatic typing machines, firstly because of the variable length of the typing cards, and secondly because of the small sprocket holes or "feed" holes punched in the cards. The reason for this is that once these cards have gone through either the punch or the reader, the card area around each hole becomes dished upwardly, so that when the cards are stacked, one upon the other, the dished portions tend to nest one within the other, and when it is then attempted to feed the top card off the pile, as by sliding it, the card immediately below the card being fed tends to move along with the latter. The dishing of the cards may also be caused by the force exerted by springs or rollers against the card for maintaining of the engagement between the holes in the card and the rotating sprocket wheels of the reading mechanism. If there is the slightest misalignment of the holes with the teeth of the sprocket wheel, the spring or roller will force the card down against the sprocket wheel, with resultant distortion of the holes. As a result of this, resistance to sliding separation of the cards is caused, and this will result in the feeding of double cards, failure to feed, or jamming of the apparatus.

SUMMARY OF INVENTION

Therefore, it is the general object of this invention to provide a feeding mechanism for cards of the above described kinds, from a stack or pile thereof, in such manner that only one card at a time is fed from the stack. While the preferred embodiment of the invention illustrated and described below is one in which the top card of a stack thereof is to be successively removed, one at a time, nevertheless, the principle and apparatus described may be, with slight modifications, inverted so that the bottom card of a stack is the one that is removed successively, one at a time.

Therefore, one object of the invention is the provision of apparatus for feeding one card at a time from a stack of cards held in a hopper, the feed mechanism minimizing, if not completely eliminating, any improper feeding such as feeding double cards, any failure to feed, or jamming of the mechanism.

Another object of the invention is to provide apparatus for feeding cards in which a "gate," which is used to permit the egress of a card from the stack of cards, is automatically positioned in such manner with respect to the stack of cards, that only the top card can issue therethrough.

A still further object of the invention is the provision of automatic feeding apparatus which can be readily attached to currently available read-out machines (such as a Friden Flexowriter or others of similar kind), the feed mechanism of this invention being adapted to feed cards one at a time without failure into the read-out machine itself, and yet being readily refillable.

Yet another object of the invention is the provision of a feed-out mechanism for feeding punch cards into a read-out mechanism, of such characteristics that the machine is adapted to use cards which are not limited in length, the feed-out mechanism feeding one card at a time to the read-out mechanism regardless of the length. A further object of the invention is to provide a feed-out mechanism for punch cards of such reliability and efficiency that a batch of such cards can be used as a substitute for a "punched tape" which must ordinarily be used in spooled rolls, the feed-out mechanism feeding one card at a time.

The invention accordingly comprises the elements and combination of elements, features of construction, arrangements of parts, and manipulation of the apparatus, all of which will be exemplified in the structures hereinafter set forth, and the scope of the application of which will be indicated in the appended claims.

In the accompanying drawings, in which one of various possible embodiments of the invention is illustrated:

FIG. 3 is a top plan view of said embodiment, the latter being shown attached to a portion of the aforesaid read-out mechanism;

FIG. 4 is a rear elevation showing certain associated mounting and springing apparatus used in conjunction with this invention;

FIG. 5 is an end view of the embodiment of FIG. 1, taken in the direction of sight lines 5—5 on FIG. 2;

FIG. 6 is an illustration of a "gate" structure utilized in this invention, the illustration showing an operating portion thereof in two positions;

FIG. 7 is an elevation of the FIG. 1 embodiment, a portion thereof being broken away to show a stack of cards, one of which is being fed out;

FIG. 8 is an end elevation, partly in section, taken in the direction of sight lines 8—8 on FIG. 3;

FIG. 9 is a view similar to FIG. 8, but showing the parts in a further operating position;

FIG. 10 is a top plan view of a portion of a conventional read-out apparatus, the view being given merely to illustrate the relationship of the feed mechanism of this invention and the read-out apparatus;

FIG. 11 is a front elevation, a portion being broken away, of the FIG. 10 read-out apparatus;

FIG. 13 is a wiring diagram showing the combined circuits of the feed mechanism of this invention and the aforesaid read-out apparatus.

Figure 1:
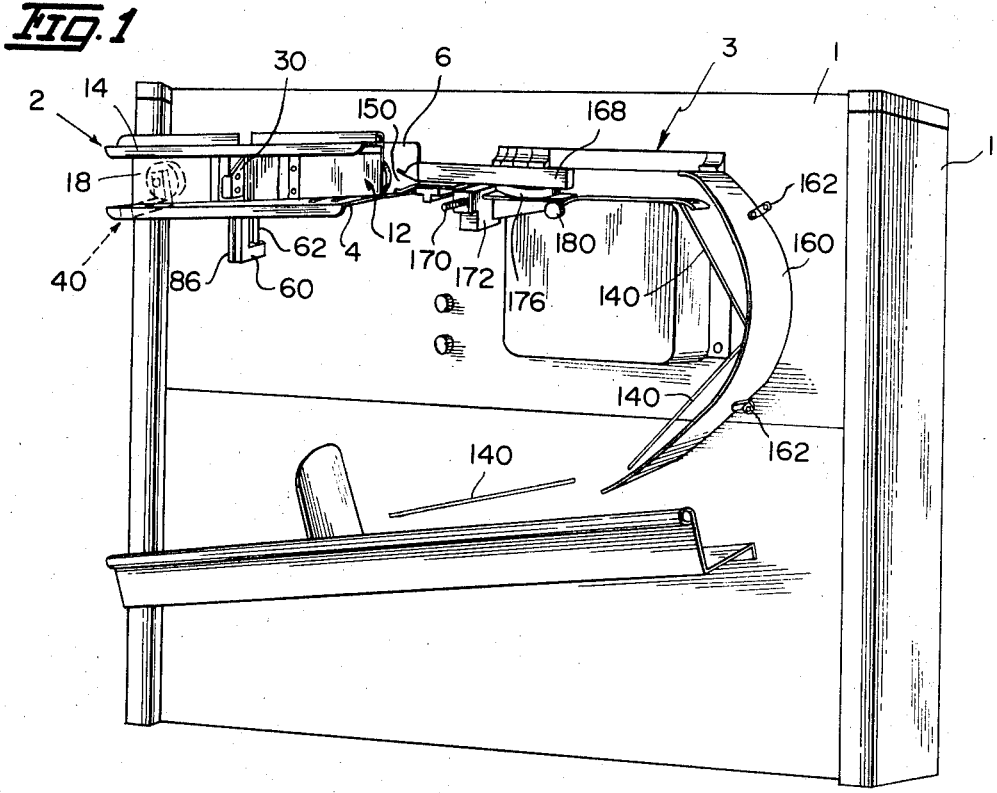
FIG. 1 is an illustration of a combination of one of several possible embodiments of this invention combined with a conventional read-out mechanism.

Similar reference characters indicate corresponding parts throughout the several views of the drawings, and in some instances, dimensions of certain of the parts as shown in the drawings have been modified and/or exaggerated for the purposes of clarity of illustration and understanding of the invention.

Figure 2:
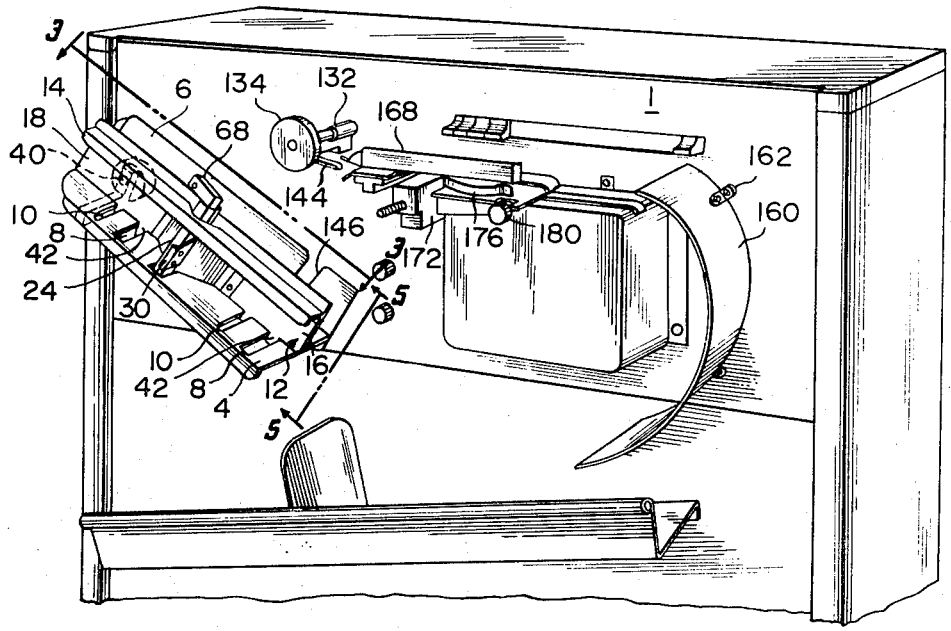
FIG. 2 is a view similar to FIG. 1, but showing the embodiment of this invention tilted into a card-loading position.

Referring now to FIGS. 1 and 2, there is indicated generally by numeral 1 the casing and front face of a reader such as a Friden Flexowriter. Mounted on the front face are a feeding mechanism of this invention indicated generally by numeral 2, and a read-out mechanism indicated generally by numeral 3. The read-out apparatus 3 is conventional, and will be briefly described below.

The feed mechanism 2 comprises generally a base 4 made of sheet metal, for example, having an upstanding rear wall 6 which may be formed as an integral part thereof, or may be of a welded construction, in which event the base 4 is provided with two downturned flanges (front and rear) the back 6 being welded to the rear flange in conventional manner.

Figure 12:
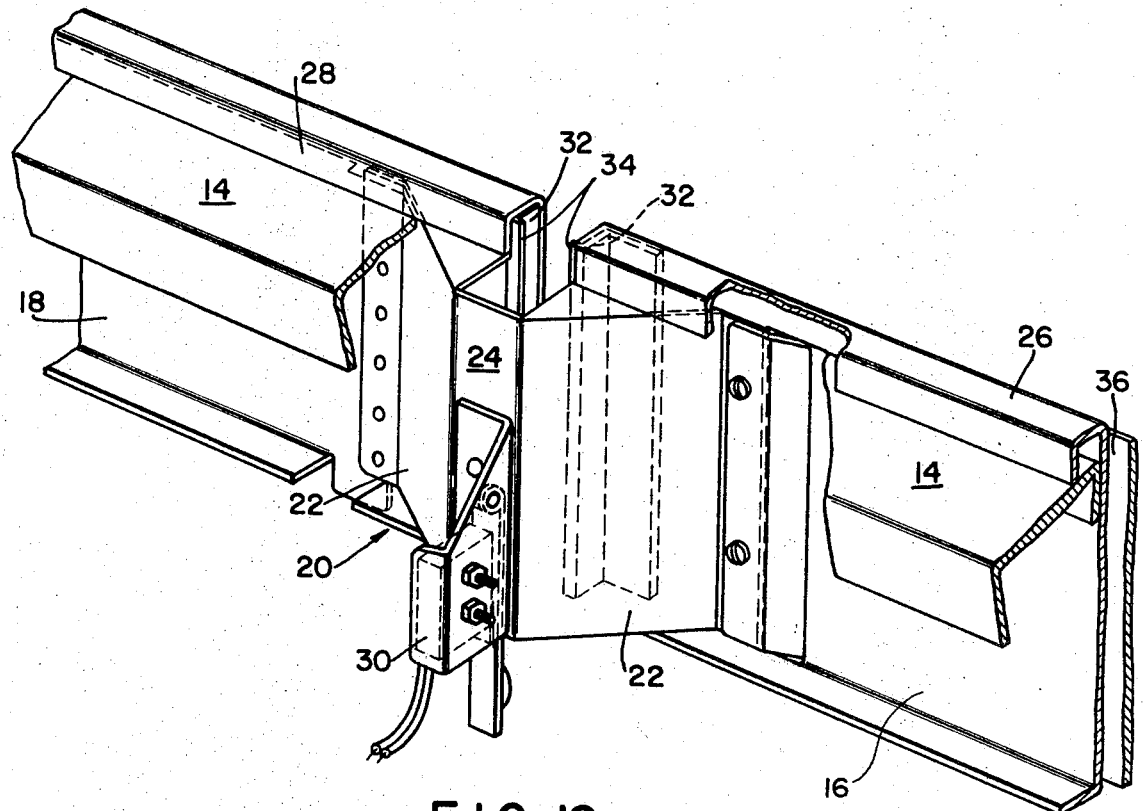
FIG. 12 is an enlarged illustration of a portion of the feed mechanism of this invention.

Base 4 is provided with the slots 8 and 10, these being for the purpose of guiding and holding in position an adjustable front wall 12. Front wall 12 (see FIGS. 2, 5 and 7) comprises an upstanding sheet metal member having welded thereto near its top edge a channel member 14, the forward edge of the channel member being turned downwardly for strength purposes, as indicated. Channel 14 may be attached to the back member 12 by providing a downturned flange on the rear edge of the channel, this downturned flange being welded by conventional means to the sheet metal plate. Member 12 comprises two wall portions of like shape, 16 and 18, these portions being held together near their upper edges by means of the channel member 14, and also being held together by a flat bottomed V-shaped member 20 (see FIG. 12), member 20 having the wings 22 and a flat face 24. The ends of the wings 22 are turned to be parallel to the face 24, and these wings are in turn welded by conventional means to the inner ends of the portions 16 and 18 which form the wall of member 12, thus strengthening the construction.

For purposes of strength and to conceal rough edges (since the embodiment is made of sheet metal) the upper edge of portions 16 and 18 are turned over and downwardly as illustrated to provide the smooth upper lips 26 and 28.

Attached to the face portion 24 is an outwardly extending sheet metal bracket 30 which is welded by a conveniently outwardly turned flange along its back edge to the face 24. The purpose of the bracket 30 is to provide a convenient handle for grasping and moving the adjustable wall 12, and also to mount a snap switch 88, the purpose of which is to indicate when the hopper formed by the back wall 6, the base 4, and the forward wall 12, is empty of cards, by stopping feed motor 130.

As indicated above, portions 16 and 18 forming the front wall 12 are separated, to leave a gap. Mounted within the gap and facing toward each other are a pair of metal inserts 32 which fit in the space formed between the wall 12 and by the downturned lips 26 and 28. Members 32 extend the full height of the portions 16 and 18, and each is provided with an inwardly facing vertical lip 34, the purpose of which is to guide in an upward and downward direction a gate member 56 described below. Also mounted by means of screws on the portion 16 of the wall 12, and positioned to overlie the inner wall of portion 16 is a flexible spring member 36, the purpose of which is to press cards in the hopper against the back wall 6.

The bottom edges of the portions 16 and 18 are provided with downwardly extending tabs 42 which are sized to slide in the channels 8. Also attached to the bottom edges of the portions 16 and 18 are the downwardly extending bolts 44 (see FIGS. 5 and 7) on which are placed suitable washers to span the channels 10. Lock nuts 46 are threaded onto the bolts 10 in order to clamp the forward plate 12 securely in position on the base 4. If desired, the bottom edge of the portions 16 and 18 may be turned outwardly in order to rest against the base 4 and thus giving a more secure support. However, such details are conventional in the art and no further description will be given here, other than to say that by suitable means such as those shown, the forward plate structure 12 is made adjustable toward and away from the plate 6 in order to permit the feeding of cards of various widths. In the adjusted position, the spring member 36 is, as indicated above, utilized to press all of the cards (see FIG. 7) against the back of the channel, that is, against the wall 6, as illustrated in FIG. 7, a stack of cards 50 being shown in position in the feed mechanism. For the purposes of clarity, the stack of cards is omitted in the other figures; except that in FIGS. 8 and 9, a stack is shown in two positions, in one of which the stack is full with operations about to commence, and the other the stack has been partly fed out.

An L-shaped bracket 40 has its short arm rotatably fastened to the face 1 of the read-out cabinet and its long arm extends under the base 4 and is attached thereto. Thus the whole assembly 2 is tiltably mounted on the face 1. The reason for this will be described below.

Referring now to FIG. 6, there is illustrated gate member 56 which is constructed as follows: An L-shaped member is provided having an upwardly extending long arm 58 and a short arm 60 affixed thereto or made integral therewith. Mounted firmly in the short arm 60 is an upright post or spindle 62 the end of which preferably lies slightly below the top 64 of the upright arm 58. By slightly below is meant a distance such as, for example, 0.005 to 0.010 inch. Rotatably mounted on the top of the arm 58 by means of an arbor 66 is a short arm 68, the fit of the arbor 66 into the short arm 68 being such that a smooth but snug fit is obtained so that once the arm 68 is moved to a given position, it will remain in that position. If desired, of course, suitable friction springs may be provided to accomplish the same purpose.

In FIG. 6, in dotted lines the arm 68 is shown moved to its operating position so that the arm is centered over the upright post 62. In this position, an extension finger 70 of the arm 58 fits into a recess 72 suitably provided in the face of the arm 68. In the solid lines in FIG. 6, the arm 68 is shown turned away from the post 62, in order to permit loading the post with the cards to be fed. When the arm 68 is in the closed position indicated by the dotted lines, the adjusting screw 74 is centered over the post 62. A button 76 is provided at the end of the adjusting screw 74, which is larger than the diameter of the post 62. Where the adjusting screw 74 projects from the upper face of the arm 68, a suitable lock washer and nut combination 78 is provided in order to hold the adjusting screw in position so that a gap of predetermined size is provided between the lower face 80 of the button 76 and the upper face 82 of the post 62. It is this gap that forms the gate that is set for the thickness of the cards that are to be fed one at a time, and which controls the feeding of only one card at a time from the stack of cards.

On each side of the long arm 58 there is provided a groove 84, these grooves being adapted to engage the tongues 34 in the insert pieces 32, so that the whole arm structure 56 may slide up and down with respect to the base 4. A suitable hole of approximately the same cross-sectional shape as the long arm 58 and short arm 60 combined is provided in the base 4 to permit the whole structure to slide up and down with respect thereto. A groove 86 is provided in the back face of the long arm 58, the groove not extending into the back face of the swing arm 68, the function of which is to trip switch 88 as will be described below.

Attached to the bracket 30 is a conventional snap-acting switch 88, of several kinds well known in the market. Between the contact actuating plunger of this switch and the face 24, there is attached to the bracket 30 a contact actuating arm 90, the latter being pivoted to bracket 30 by conventional means. The lower end of the arm 90 terminates in an outwardly extending finger 92 which is so positioned as to ride in the groove 86. The operation of this is such that when the bottom face of the button 76 reaches approximately the top surface of the base 4, the whole gating structure 56–60–62–68 will have moved downwardly with respect to the base 4 (all of which will be explained below) so that the tab 92 rides out of the groove 84 by encountering the non-grooved back face of the swing arm 68. The result of this is to depress the plunger of the switch 88, which then signals appropriately to indicate that the hopper is emtpy.

As has been indicated above, the entire hopper mechanism 2 is pivotally mounted on the front face of the cabinet 1 by means of the tilting bracket 40. The remaining portion of this will now be described in order to illustrate how the hopper is tilted downwardly for filling.

Referring now to FIGS. 3 and 4, the short arm 94 of the bracket 40 has mounted therein a pin or axle 96 which traverses a bearing bushing 98 which is fastened by conventional means, such as welding, to the front surface of the cabinet 1. At the rear of the cabinet, there is fastened to the axle 96 an arm 100 by means of a conventional hub 102. The arm 100 has mounted thereon a conventional snap switch 104 which has extending therefrom a contact actuating arm 106. Attached to the end of the arm 100 in a pivoted manner is a second arm 108 which is provided with a clevis or closed slot 110 at its other end. A screw and washer assembly 112 pass through the slot 110 so that the arm 108 may slide thereon. A pair of bearing washers 114 are provided on the arm 108, and a compression spring 116 is mounted between these washers. The end of the contact arm 106 is provided with a closed loop 118 which enevlopes the upper end of the arm 108 as shown in FIG. 4.

FIG. 4 illustrates (in dotted lines) a second position of the arm 100 and the arm 108 when the hopper 2 is rotated clockwise (as viewed in FIG. 1) in order to fill the hopper. A pin 120 is fastened by convenient means in the face 1 to act as a stop for the arm 100 when it is moved down. It will be observed that the motion of the arm is an over-centering action, and that when the arm 100 is in position as shown in full lines in FIG. 4, the arm is free to move or rotate clockwise (as viewed in FIG. 4) because of the freedom of the slot 110 to ride on the stud 112. On the other hand, once the washers 114 are in engagement with the spring 116, there is a resilient holding action which prevents the arm 100 from rotating counterclockwise (as viewed in FIG. 4) until it is desired to fill the hopper. At that time, one can grasp the end of the hopper 2 from the position shown in FIG. 1, and move it clockwise (as viewed in FIG. 1) beyond the overcenter axis existing between the pin 112 and the pin 96, the spring then acting to hold the arm resiliently against the stop pin 120. The hopper may be then filled with cards, as shown in FIG. 8, and a movement of the hopper from the downward loading position to the position shown in FIG. 8 will cause the arm 100 again to traverse its over-center axis with a snap-action, until the hopper is in a position shown in FIG. 8 at the start of an automatic feeding operation.

When the arm 100 is in the position shown in dotted lines in FIG. 4, it will be noticed that the angular relationship of the arms 108 and 100 is such as to cause the arm 108 to draw against the loop 118 of the contact arm 106. The result of this is to move the contact arm toward the snap switch 104, thus opening the circuit thereof. As will be explained below, opening the circuit of the snap switch 104 will stop the machine from operating.

Mounted on the back of the panel 1 is a motor 130 having a shaft 132 which projects through the panel. Mounted on the end of the shaft by convenient means is a rubber tired drive wheel 134 a function of which is to engage frictionally the top card of a stack of cards in the hopper, and move the card from the left to the right as viewed in FIG. 1. As indicated above, the drive wheel 134 is fastened by conventional means to the shaft 132, as by means of a slotted groove in the shaft and a pin in the hub of the wheel 134. Since this is conventional, no further description will be given herein.

At the start of a feeding operation, and with the hopper loaded, a reference to FIG. 7 will show the approximate position of these various elements. The hopper itself is resiliently biased upward by the spring 116, so that the top card 140 of the stack of cards 50 is pressed gently but firmly against the tire on the rubber wheel 134. It will also be noticed by reference to FIGS. 8 and 9 that the various cards are punched with a hole 142 which permits the passage of the post 62 through the cards. However, hole 142 is smaller than the button 76, so that the button spans the hole. Thus, because of the fact that the gating structure 56 is free to move downwardly with respect to the base 4, the button 13 will lie on the top card, the gating structure being supported thereby. If, now, the gap in the gate between the bottom face 80 of the button 76 and the top face 82 of the post 62 is made just slightly greater than the thickness of the cards in the stack 50, it is obvious that only one card can pass at a time through the gate. However, and this is critical, it will also be observed that when that one card has passed completely through the gate, the gating structure 56 again moves downwardly until the button 76 rests on the next succeeding top card. Under the influence of the rotating wheel 134, this next succeeding top card is then moved out through the gate, with all cards lying underneath the top card being retained as was the case for the first card. Successive removal of cards is obtained in exactly the same manner.

If it is desired to sort or feed thicker or thinner cards, then the gap between the surface 80 of button 76 and surface 82 of post 62 is adjusted to the correct width so as to pass just one of the cards desired to be fed.

One important feature and advantage of the invention is to be noted, viz, that it is not necessary to use cards of any given length. That is, cards several times longer than the conventional IBM cards, for example, may be used, and the feed wheel 134 will feed such a long card through the gate until it has passed completely therethrough. At that point, the gating structure 56 again moves downwardly in order to rest on the next succeeding card preparatory for permitting only it to pass through the gate.

The above description of the essential part of the invention is described as having a certain construction. It is obvious that to the skilled mechanic, other forms of performing the various functions of the various elements may be designed to work in accordance with the teachings herein. For example, instead of using the tongued guides 34 with grooves 84 in the gating structure 56, a linear ball bearing system may be used to guide gating member 56, to eliminate as much friction as possible which might hinder the movement up and down of the gating structure. Also, other means may be used to adjustably support the movable wall or fence 12 instead of the rather simple means shown herein. Instead of the drive wheel 134, other means of moving the top card forward and through the gate may be used. These may be "pusher" type arms such as used in some types of feed, or they may be vacuum type cups that attach themselves to the card and then move to carry the card or paper through the gate. In addition to the above, it is to be noted that in the particular embodiment, the gating structure 56 is arranged to drop vertically with respect to the base 4 as each card is removed. Of course, it is obvious that as each card is removed, the spring 116 will move the entire hopper upwardly so that the next succeeding card comes against the drive wheel 134. However, it is also to be noted that instead of having a gating structure which is arranged to have cards removed from the top protion of the gating structure as described above, the gating structure could be turned upside down with the gap existing at the bottom. The drive wheel or other means of feeding cards would then be positioned to move the bottom card successively through the gate thus described. Such changes are, as indicated, within mechanical skill to devise once these teachings are understood and for this reason such other embodiments are not detailed herein, a useful and operative embodiment of the invention having been given above.

In the event that a card is moving from the top of the stack 50 into the reading mechanism 3, the card may become bound in some fashion and therefore buckle. If this happens, it is desirable to stop the feed from operating. For this purpose, a switch 140 is provided of conventional nature, the switch being mounted on a bracket 142 which is mounted on the face 1. A switch actuating contact arm 144 extends outwardly from the switch in position to rest against the top card being fed from the stack of cards 50 (see FIG. 7). If this top card should buckle, the switch will be deflected upwardly, thus stopping the motor 130 which drives the feed wheel 134.

A slot 146 is provided in the wall 6 in order to receive the inwardly projecting end 142 of the bracket, the same slot accepting the drive shaft 132 which rotates the drive wheel 134, as the hopper moves upwardly and downwardly with respect to the drive shaft during the operation of feeding cards or loading cards.

While it is not a part of this invention, nevertheless a brief description will be given of a read-out apparatus 3 which will receive cards from the feeding mechanism 2 and read them.

From the feed mechanism 2, a top card 140 is received by a guide throat 150 formed by conventional sheet metal parts, the function of which is to guide the card properly into the read-out device itself (see FIG. 7). From the throat 14 the card passes over a sprocket wheel 152 the teeth of which project up through suitably provided slots 154 in both plates of the throat guide mechanism (see FIG. 10). The teeth 152 are fashioned to engage the usual kind of perforations found in information cards of the type to be used with this invention, and the card guide mechanism starting with the throat 150 is provided with a suitable back guide so that when the cards pass into the throat and thence through the read-out apparatus, the perforations in the card will be aligned with the teeth of the sprocket wheel 152. From the sprocket wheel, the cards continue forward through the read-out apparatus past a conventional opening 156 through which the cards may be visually read if desired, and then over a second sprocket wheel 158 which assists the first sprocket wheel in guiding cards through the read-out device. From the sprocket wheels the cards pass outwardly of the read-out apparatus and are guided by a curved guide member 160 which is attached by a conventional series of brackets 162 to the face 1 of the cabinet. The effect of the curved guide member 160 is to turn the cards over as they emerge, so that the first card to be read from a deck is turned with its reading matter facing downwardlyy in the turning sequence. Thus, the cards are stacked up on exit from the machine in the same order as they are placed in the feeding mechanism 2. A pair of switches 164 and 166 are mounted on the read-out apparatus by conventional means, the contact arms of which are positioned so that when a card passes through the guide plates of the read-out mechanism, these switches will be actuated as will be described below in the description of the wiring diagram. A suitable cover 168 encloses the switches.

Mounted on a guide rod 170 in a sliding member 172 the function of which is to support a pair of springs 174 and 176. The guide member 172 is moved to such position that springs 174 and 176 press gently but firmly against the cards as they pass through the read-out apparatus to force the cards against the back stop, and thus keep the perforations in the card in alignment with the sprocket wheels 152 and 158. Suitable means for holding the member 172 in its proper position on the guide member 170 are provided. Shown in FIG. 10 in dotted lines is a second position of the guide member 172 to illustrate the position that will be occupied for fairly wide cards.

Also provided, as is conventional in most read-out machines, is a knurled knob 180 which is attached at the end of the shaft which' drives the sprocket wheel 158. By means of the knob 180, sprocket wheel 158 may be turned manually in order visually to read progressively certain selected portions of a card passing through the read-out device. Or, the knob may be used as is conventional, to position the card at a given point with respect to the read-out device. Suitable motors, not shown, actuate the sprocket wheels 152 and 158.

A further feature of the invention is the provision of means to act as a brake on the motor driving the feed wheel 134 when the switches connecting the motor to the line are disconnected by certain operations of the apparatus. Referring now to FIG. 4, mounted on the back of the panel 1 is the plate 190 which serves to mount the parts of a brake for the motor 130. The rear end 191 of the shaft 132 of the motor 130 is shown, on which is mounted a brake drum 192. Pivotally attached to the plate 190 is a lever 194 one end of which is engaged by a tension spring 196 so as to bias the lever 194 counterclockwise as viewed in FIG. 7. The other end of the lever is engaged by the plunger 198 of a solenoid 200. The lever 194 has an arm 202 projecting laterally therefrom as shown, and mounted on arm 202 is a pin 204. Another pin 206 is mounted on the lever as indicated. A brake strap 208 fastened to the pins 204 and 206 and is entrained on the brake drum 192.

The operation of the brake mechanism is as follows: When there is no power on the solenoid 200, the tension spring 196 moves the arm 194 counterclockwise about the pivot, with the result that the brake strap 208 is tightened on the drum 192. This results in stopping the shaft of the motor 130 so that there is no free running thereof. On the other hand, when the motor is energized and, as will be explained below, there is also power on the solenoid 200, the arm 194 is rotated clockwise as viewed in FIG. 4, with the result that the tension of the brake strap 208 is lessened, and the motor is free to operate.

Referring now to FIG. 13, a wiring diagram for the above apparatus is shown. Power lines 210 and 212 are shown, and connections are made as follows: Power line 210 is connected to the switch 88 which breaks the circuit to the feed motor when the hopper is empty. Switch 88 is connected serially to switch 104 which breaks the power to the motor when the hopper is in the loading position. Switch 104 is connected serially to switch 140 which is the buckle switch and which will break the circuit to the motor 130 if a card should buckle during a feeding operation. Switches 164 and 166 have one end of each connected together, and the contact points of the switches are connected together parallel and to the switch 140. The switch arms of switches 166 and 164 are parallel connected to the motor 130, and the other side of the motor is connected to line 212. The solenoid 200 is connected in parallel with the motor 130.

The operation of the circuit and apparatus is as follows: The feed mechanism 2 is rotated downwardly into a feed position, and the top bar 68 is rotated away from the post 62 as shown in FIG. 6. A stack of cards is arranged with the punched holes in alignment, and the gating mechanism 56 is then manually moved upwardly with respect to the base 4, so that the cards may be placed over the post 62 and on base 4 between back wall 6 and front wall 12. The arm 68 is then moved clockwise (as drawn in FIG. 6) to bring the button 76 in juxtaposition with the post 62.

The gating structure 56 is then released, so that the surface 80 of button 76 will come to rest against the top card. This is the position shown in FIG. 8.

When the feed mechanism 2 was rotated to its loading position, the switch 104 was opened by the motion of the arm 100 to the dotted line position shown in FIG. 4. Also, because of the fact that during this initial movement of the feed mechanism 2 to the position shown in FIG. 2, the gating structure 56 was in its bottommost position, the switch 88 (the "empty" switch) was also open. However, when the gating structure 56 is moved upwardly to accept the cards to be fed, this closes the switch 88, and when the feed mechanism 2 is rotated to its FIG. 1 position, thus rotating the arm 100, the switch 104 is closed. Since there is no card to cause the switch 140 to be actuated as by buckling, the switch 140 is closed. Similarly, switches 164 and 166 are closed, since there is no card to move them to the open position. Thus, the motor 130 is energized as well as the solenoid 200 and the feedwheel 134 is rotated to feed a card into the throat 150 of the read-out device 3. This card, as it moves on its way from the feed mechanism to the reader, encounters the hold switch 164 which it opens. However, since the switches 164 and 166 are in parallel, and since switch 166 is still closed, the feed wheel 134 continues to feed the card further into the read-out apparatus until the switch 166 is encountered by the card. When this happens, both switches 164 and 166 are now opened, and the feed motor 130 is disconnected from the line, together with the solenoid 200. Disconnection of the solenoid 200 automatically drives the brake described above, to stop the feed mechanism from running.

However, at this point, the conventional drive motors for the read-out mechanism have engaged the card by means of the sprocket wheels 154 and 158, and these motors continues to rotate the sprocket wheels to feed the card through the read-out device. It is to be noticed, however, that just as soon as the tail of a card passes by the feed switch 164 this switch closes and this immediately reconnects the motor 130 which then actuates the feed wheel 134 to feed another card into the read-out mechanism. The operation of feeding cards then continues in succession.

Since it is obvious that both the hold switch and the feed switch must be in open position to deenergize the feed motor, this will occur if the tail end of one card is under one switch and the leading portion of the next card is under the next switch, or until one card is under both switches. This will cause the new card from the hopper to hold at the hold switch position until the card being read is out of the way.

In view of the above it will be seen that the several objects of the invention are achieved and other advantageous results attained.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As many changes could be made in the above constructions without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

Having described the invention, what is claimed is:

1. Apparatus for feeding individual cards one at a time from a stack thereof, each of the cards being provided with an opening therein and all of the openings being aligned in the stack, comprising:

a base;

first means for holding said stack in alignment on the base;

drive means positioned with respect to said base to engage successive first cards lying at the surface of said stack, the drive means and the base being movable toward each other so that regardless of the height of said stack, the drive means is positioned to engage each of said first cards; and gate means perpendicularly mounted on the base and adapted to move with respect thereto, the gate means comprising two members adjustably positioned in relation to each other to provide a gap therebetween, the gap being in width less than the thickness of two cards but more than the thickness of one card, whereby the gate means is adapted, in cooperation with said openings, to restrain all cards against delivery from the apparatus except said surface card, only the latter being able to pass through the gate means.

2. The apparatus of claim 1 including mounting means for resiliently pivotally securing the apparatus on a read-out device in one position to feed cards to the device and in a second position to load the apparatus, said mounting means comprising a first arm having one end attached to the apparatus, and spring means operatively associated with the other end of the arm, the spring means resiliently biasing the arm and connected apparatus to a position such that as each card is fed from the apparatus, it is positioned to enter the read-out device properly.

3. The apparatus of claim 2 including a second arm having one end attached to said other end of the first arm, the other end of the second arm being slidably attached to the readout device, and said spring means being a compression spring mounted on the second arm, whereby when the said apparatus is in feeding position, the bias of the spring on the apparatus is continuous, but when the apparatus is in loading position, the spring biases the apparatus away from the read-out device.

4. The apparatus of claim 1 in which said first means comprises a wall attached to the base for aligning cards thereon, and being adjustable for cards of a given width, the gate means comprising a rectangular frame having a top leg, a bottom leg, and a first post mounted in the bottom leg and extending toward, but terminating short of, the top leg, thereby to provide said gap therebetween, the post being adapted to extend through the opening in the cards in said stack when aligned, the top leg being movably secured to the side leg whereby the legs may be separated for loading cards on the post; and the gap between the top leg and the post constituting a gate smaller in width than twice the thickness of two of said cards, but greater in width than the thickness of one card.

5. The apparatus of claim 4 including adjusting means on said gate means for varying the width of said gap.

6. The apparatus of claim 5 in which said adjusting means constitutes a second post adjustably fixed in the top leg and in axial alignment with the first post when the top leg overlies the latter, the second post having an end adjacent the top of the first post which is larger in diameter than the said holes in the cards, said gap then being the distance from the bottom of said end to the top of the post.

7. The apparatus of claim 4 in which said top leg lies against the successive first card when the apparatus is in feeding position and loaded with a stack of cards, the gating means being self-adjusting as feeding progresses so that after each card is delivered successively through said gap, the gating means automatically moves to bring the top arm against the next successive first card.

8. The apparatus of claim 1 in which said drive means comprises an electric motor fastened to the read-out device, and a friction wheel fastened to the shaft of the motor, the motor and friction wheel being positioned so that the latter will engage cards in said apparatus; the apparatus including switch means for controlling the energization of the motor, the switch means being actuated by said gate means to stop said motor when the apparatus is empty of cards.

9. A gate means for selectively permitting the issuance of only one card at a time from a stack of cards of indeterminate length, each card when stacked with other cards having a hole therein in alignment with holes in all other cards of the stack comprising:

supporting means for holding a stack of said cards;

a rectangular frame mounted perpendicular to said supporting means and movable perpendicularly thereto, said frame comprising a vertical leg, a bottom leg fixed thereto, and a top leg pivotally mounted by one end to the top of the vertical leg, and a post attached to the bottom leg and extending toward the top leg, but terminating short of the latter to leave a gap therebetween;

said gap being less in width than the thickness of two of said cards but greater in width than one of said cards; and said post being adapted to extend through the aligned holes of the cards in said stack thereby to hold the cards on the post except for the first card which is adapted to pass through said gap.

References Cited

UNITED STATES PATENTS

| 390,277 | 10/1888 | Allen | 271—39 |
| 2,133,726 | 10/1934 | Staude | 271—39 |
| 3,285,601 | 2/1955 | Zeuthen | 271—22 X |
| 3,358,991 | 12/1967 | Jensen, et al. | 271—61 |

EVON C. BLUNK, Primary Examiner

D. D. WATTS, Assistant Examiner